US011329959B2

(12) United States Patent
Pan (10) Patent No.: US 11,329,959 B2
(45) Date of Patent: May 10, 2022

(54) VIRTUAL ROUTING AND FORWARDING (VRF)-AWARE SOCKET

(71) Applicant: Fortinet, Inc., Sunnyvale, CA (US)

(72) Inventor: Yixin Pan, Burnaby (CA)

(73) Assignee: Fortinet, Inc., Sunnyvale, CA (US)

(*) Notice: Subject to any disclaimer, the term of this patent is extended or adjusted under 35 U.S.C. 154(b) by 808 days.

(21) Appl. No.: 16/229,112

(22) Filed: Dec. 21, 2018

(65) Prior Publication Data

US 2020/0204520 A1 Jun. 25, 2020

(51) Int. Cl.
| | |
|---|---|
| *G06F 15/16* | (2006.01) |
| *H04L 29/06* | (2006.01) |
| *H04L 61/4511* | (2022.01) |
| *H04L 69/16* | (2022.01) |

(Continued)

(52) U.S. Cl.
CPC ........ *H04L 63/0281* (2013.01); *H04L 45/586* (2013.01); *H04L 45/745* (2013.01); *H04L 61/1511* (2013.01); *H04L 63/1408* (2013.01); *H04L 69/16* (2013.01); *H04L 63/0245* (2013.01)

(58) Field of Classification Search
CPC . H04L 63/0281; H04L 45/586; H04L 45/745; H04L 61/1511; H04L 63/1408; H04L 69/16; H04L 63/0245
See application file for complete search history.

(56) References Cited

U.S. PATENT DOCUMENTS

| | | | | |
|---|---|---|---|---|
| 10,129,144 B1 * | 11/2018 | Singh | ...................... | H04L 45/66 |
| 10,356,038 B2 * | 7/2019 | Sharma | ............... | H04L 67/1002 |
| 10,454,823 B1 * | 10/2019 | Thomas | .................. | H04L 47/17 |

(Continued)

FOREIGN PATENT DOCUMENTS

| | | | | |
|---|---|---|---|---|
| WO | WO-2006095203 A1 * | 9/2006 | ............. | G06Q 20/38 |
| WO | WO-2016119724 A1 * | 8/2016 | ............. | H04L 45/64 |

OTHER PUBLICATIONS

Deploy Multi Protocol Label Switching (MPLS) Using Virtual Routing and Forwarding (VRF) Samiullah Mehraban;Komil. B. Vora;Darshan Upadhyay 2018 2nd International Conference on Trends in Electronics and Informatics (ICOEI) Year: 2018 | Conference Paper | Publisher: IEEE (Year: 2018).*

(Continued)

*Primary Examiner* — Oscar A Louie
*Assistant Examiner* — Oluwatosin M Gidado
(74) *Attorney, Agent, or Firm* — Law Office Of Dorian Cartwright; Dorian Cartwright (57) ABSTRACT

Systems and methods for a VRF-aware socket are provided. According to one embodiment, a user-space application of a network device, maintaining a virtual routing table for each of multiple VRF domains, creates a VRF-aware listening socket. The socket includes information regarding: (i) which of the virtual routing tables is to be used to look up routing or forwarding information for outgoing traffic; (ii) the VRF domain(s) from which the socket is able to receive incoming traffic; and/or (iii) the last VRF domain from which the socket read data. The socket is configured to be a super-VRF listening socket capable of receiving incoming traffic from all VRF domains by setting its VRF domain(s) to a wildcard value. The super-VRF listening socket then receives from a client device associated with a first VRF domain of the multiple VRF domains a request on behalf of the user-space application.

14 Claims, 8 Drawing Sheets

(51) Int. Cl.
*H04L 45/745* (2022.01)
*H04L 45/586* (2022.01)

(56) References Cited

U.S. PATENT DOCUMENTS

| | | | | |
|---|---|---|---|---|
| 2006/0245414 | A1* | 11/2006 | Susai | H04L 63/0272 370/352 |
| 2018/0338264 | A1* | 11/2018 | Kim | H04W 28/0236 |
| 2019/0082445 | A1* | 3/2019 | Yang | H04W 72/12 |
| 2020/0007548 | A1* | 1/2020 | Sanghavi | H04L 63/0209 |
| 2020/0204520 | A1* | 6/2020 | Pan | H04L 45/745 |

OTHER PUBLICATIONS

An Extensible Design of a Load-Aware Virtual Router Monitor in User Space Harry F.W. Choi;Patrick P.C. Lee 2011 40th International Conference on Parallel Processing Workshops Year: 2011 | Conference Paper | Publisher: IEEE (Year: 2011).*

* cited by examiner

```
┌─────────────────────────────────────────────────────────────────────────────────┐
│ CREATING, IN A NETWORK DEVICE, A SUPER-VRF LISTENING SOCKET THAT IS CONFIGURED  │
│ TO RECEIVE DATA PACKETS AND REQUESTS FROM ANY VIRTUAL ROUTING AND FORWARDING    │
│ (VRF), WHEREIN SAID SUPER-VRF LISTENING SOCKET COMPRISES VRF IDENTIFICATION     │── 562
│ INFORMATION SELECTED FROM ANY OR A COMBINATION OF INFORMATION PERTAINING TO     │
│ WHICH VIRTUAL ROUTING TABLE TO BE USED TO LOOK UP FOR OUTGOING TRAFFIC          │
│ (SK_SVRF), INFORMATION PERTAINING TO WHICH VRF TRAFFIC IS THE SOCKET ABLE TO    │
│ RECEIVE (SK_RVRF), AND INFORMATION PERTAINING TO WHICH VRF WAS THE DATA JUST    │
│ READ FROM (SK_ERVRF).                                                           │
└─────────────────────────────────────────────────────────────────────────────────┘
                                        │
                                        ▼
┌─────────────────────────────────────────────────────────────────────────────────┐
│ CONFIGURING, THROUGH THE NETWORK DEVICE, A DOMAIN NAME SYSTEM (DNS) PROXY FOR   │
│ A PLURALITY OF VRFs THAT ARE CONNECTED TO SAID NETWORK DEVICE SUCH THAT SAID    │── 564
│ SUPER-VRF LISTENING SOCKET IS CONFIGURED IN SAID DNS PROXY, WHEREIN A FIRST     │
│ VRF (VRF_1) OF THE PLURALITY OF VRFs COMPRISES A DNS SERVER                     │
└─────────────────────────────────────────────────────────────────────────────────┘
                                        │
                                        ▼
┌─────────────────────────────────────────────────────────────────────────────────┐
│ READING, AT THE DNS PROXY, A DNS REQUEST FROM A SECOND VRF (VRF_2) HAVING A     │── 566
│ CLIENT DEVICE SO AS TO SET THE VALUE OF sk_evrf TO VRF_2 AND SET THE VALUE OF   │
│ sk_svrf TO VRF_1                                                                │
└─────────────────────────────────────────────────────────────────────────────────┘
                                        │
                                        ▼
┌─────────────────────────────────────────────────────────────────────────────────┐
│ FORWARDING, FROM THE DNS PROXY, THROUGH THE SUPER-VRF LISTENING SOCKET, THE     │── 568
│ DNS REQUEST TO THE DNS SERVER                                                   │
└─────────────────────────────────────────────────────────────────────────────────┘
                                        │
                                        ▼
┌─────────────────────────────────────────────────────────────────────────────────┐
│ RECEIVING, AT THE DNS PROXY, FROM THE DNS SERVER, A DNS RESPONSE TO THE         │── 570
│ SUPER-VRF LISTENING SOCKET TO ENABLE THE DNS PROXY TO SET THE VALUE OF sk_svrf  │
│ TO VRF_2                                                                        │
└─────────────────────────────────────────────────────────────────────────────────┘
                                        │
                                        ▼
┌─────────────────────────────────────────────────────────────────────────────────┐
│ FORWARDING, FROM THE DNS PROXY, THE DNS RESPONSE TO THE CLIENT DEVICE           │── 572
│ CONFIGURED IN VRF_2                                                             │
└─────────────────────────────────────────────────────────────────────────────────┘
```

VIRTUAL ROUTING AND FORWARDING (VRF)-AWARE SOCKET

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to network communications, Virtual Routing and Forwarding (VRF) and socket application programming interfaces (APIs). In particular, embodiments of the present invention provide a VRF-aware socket to more efficiently support usage scenarios in which a user-space application of a networking device (e.g., a web server, a network security device or a network gateway) provides a service on behalf of multiple VRFs or otherwise needs to receive communications from multiple VRFs.

Description of the Related Art

In Internet Protocol (IP)-based computer networks, virtual routing and forwarding (VRF) is a technology that allows multiple instances of a routing table to co-exist within the same routing device at the same time. Because the routing instances are independent, the same or overlapping IP addresses can be used without conflicting with each other. Network functionality is improved because network paths can be segmented without requiring multiple routing devices. Because traffic is automatically segregated, VRF also increases network security and may eliminate the need for encryption and authentication.

A network socket or simply a "socket" is an internal endpoint that may be used for sending or receiving data within a node on a computer network. A socket may be used as a logical endpoint for communication, and an interface between a user-space application and the operating system kernel to exchange network data. Sockets exists in the transport layer of the Internet model, receive data from the IP layer for user-space applications, and send data to the IP layer on behalf of user-space applications.

Sockets provided by existing socket application programming interfaces (APIs) are not VRF-aware. As such, when a routing device with overlapping IP addresses is required to receive communications from multiple VRFs, for example, to be managed remotely by multiple VRFs, or to implement a transparent proxy to perform security scanning on behalf of multiple VRFs, or to implement a Domain Name Service (DNS) proxy to service multiple VRFs, a listening socket needs to be created for each VRF which wastes system resources and complicates implementation of the aforementioned usage scenarios.

SUMMARY

Systems and methods are described for a Virtual Routing and Forwarding (VRF)-aware socket. According to one embodiment, a user-space application running on a network device that maintains a virtual routing table for each virtual routing and forwarding (VRF) domain of multiple VRF domains creates a VRF-aware listening socket. The VRF-aware listening socket includes VRF identification information selected from any or a combination of: (i) information pertaining to which of the virtual routing tables is to be used to look up routing or forwarding information for outgoing network traffic; (ii) information pertaining to one or more VRF domains from which the VRF-aware listening socket is able to receive incoming network traffic; and (iii) information pertaining to a last VRF domain from which the VRF-aware listening socket most recently read data. The VRF-aware listening socket is configured by the user-space application to be a super-VRF listening socket that is capable of receiving incoming network traffic from all of the VRF domains by setting the information pertaining to the one or more VRF domains to a wildcard value. The super-VRF listening socket then receives from a client device associated with a first VRF domain of the multiple VRF domains a request on behalf of the user-space application.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for a Virtual Routing and Forwarding (VRF)-aware socket. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "Virtual Routing and Forwarding" and the acronym "VRF" generally refer to a technology that allows multiple instances of a routing table to co-exist within the same routing device at the same time. While in certain contexts a VRF may refer to an instance of a routing table within a networking device that is used to choose an outgoing interface of the networking device and possibly a next hop for a particular destination, as used herein, a VRF is intended to refer to an area/domain encompassed by the specified VRF or a set of nodes encompassed within or associated with the VRF. In such cases, the VRF may be referred to as a "VRF domain" for clarity.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Systems and methods are described for a VRF-aware socket. Embodiments of the present invention provide a VRF-aware socket to more efficiently support usage scenarios in which a user-space application of a networking device (e.g., a web server, a network security device or a network gateway) provides a service (e.g., security scanning and/or DNS) on behalf of multiple VRFs or otherwise needs to receive communications from multiple VRFs to, for example, be managed remotely. According to various embodiments of the present disclosure, a Super-VRF listening socket is created in a network device and is configured to receive data packets and/or requests from any VRF associated with the network device. In the context of embodiments of the present invention, a socket data structure is extended to include VRF identification information that controls which VRF to use for outgoing data and from which VRF(s) traffic can be sent to the socket. The socket API may also be extended to allow user-space applications to include a method (e.g., setsockopt( )) to specify a socket's VRF identification and a method (e.g., getsockopt( )) to retrieve a socket's VRF identification. In one embodiment, a super-VRF listening socket can receive data and requests from any VRF or be limited to one or more specific VRFs. Thus, embodiments of the present disclosure eliminate the need for configuring multiple listening sockets (one for each VRF) in the network device.

Figure 1:
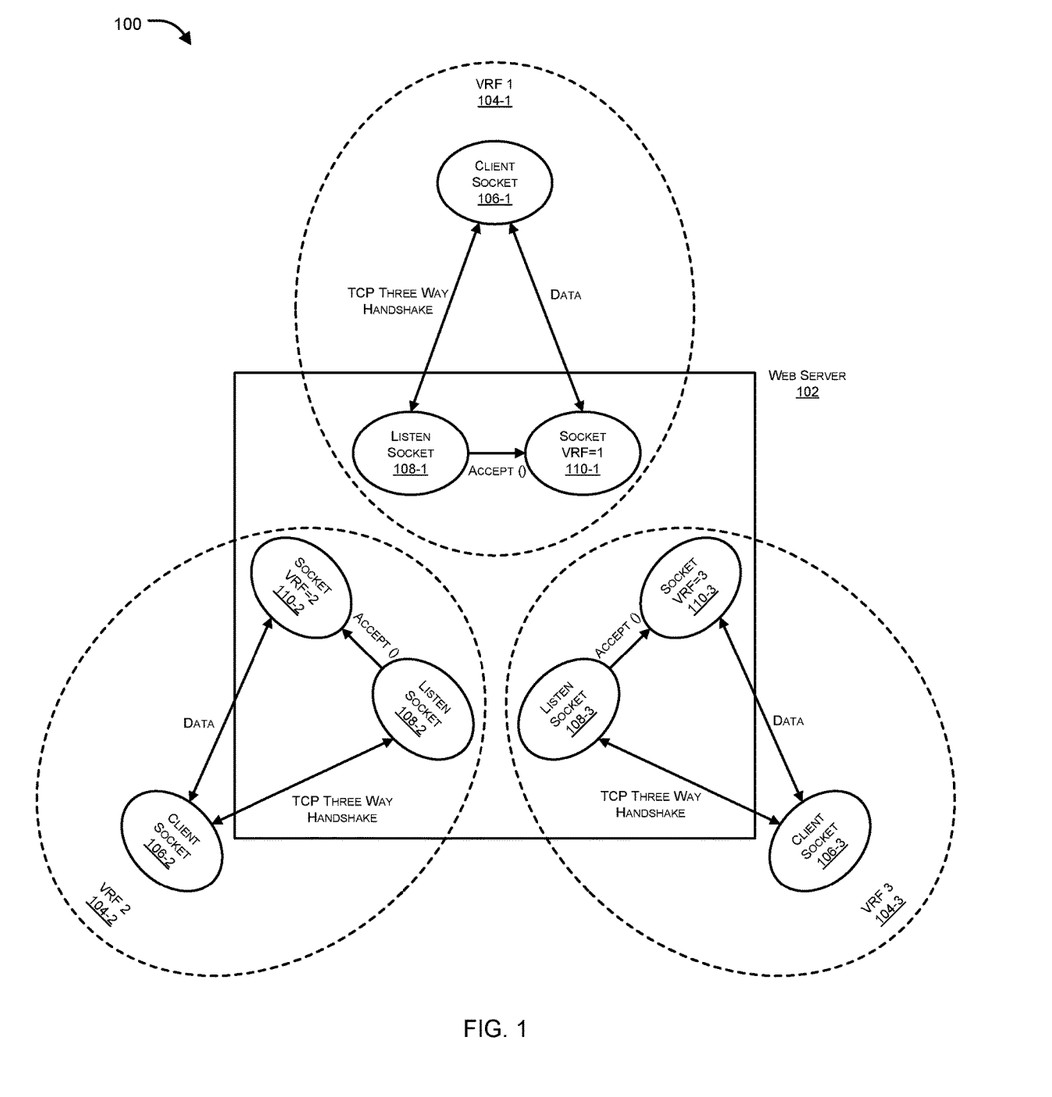
FIG. 1 illustrates a simplified example in which a web server makes use of VRF-aware sockets.

FIG. 1 illustrates a simplified example in which a web server 102 makes use of VRF-aware sockets. The present example is provided to illustrate, while VRF awareness addresses some of the limitations of existing socket implementations, VRF awareness alone is not sufficient to address all of the limitations of existing socket implementations. For example, even after making a socket aware of a particular VRF with which it is associated, if there are hundreds of VRFs in a routing device, and the device can be managed by every VRF via hypertext transfer protocol (HTTP), the web server handling HTTP traffic on behalf of the routing device will have to create hundreds of HTTP listening sockets, one per VRF. As those skilled in the art will appreciate based on the example below, a more efficient approach is to create one super-VRF listening socket, which can accept requests from any VRF.

In context of the present example, which again is provided to illustrate limitations of simply providing VRF-aware sockets without the ability to listen to all VRFs, each VRF in which a network device (e.g. Web server 102) participates is configured with a VRF-aware listening socket that identifies initiation of the TCP three way handshake by a client device in its VRF and/or handles the TCP three way handshake initiated by a client device in its VRF and then creates a client-facing socket to facilitate exchange of data between the client-facing socket and a corresponding socket on the client device. In most cases, the client-facing socket is created upon initiation of the three-way handshake, but those of ordinary skill in the art will appreciate there are scenarios in which the creation of the client-facing socket might be delayed until successful completion of the three-way handshake. For example, the client facing socket can be delayed until successful completion of the three-way handshake when techniques (e.g., the use of SYN cookies) are used to resist SYN flooding attacks.

For example, in the context of the present example, web server 102 is associated with three VRFs (i.e., VRF 104-1, VRF 104-2 and VRF 104-3). Web server 102 may create a VRF-aware listening socket 108-1 that only processes packets associated with VRF 104-1 to support exchange of data between client socket 106-1 and VRF socket 110-1. Similarly, web server 102 may create a VRF-aware listening socket 108-2 that only processes packets associated with VRF 104-2 to support exchange of data between client socket 106-2 and VRF socket 110-2; and web server 102 may create a VRF-aware listening socket 108-3 that only processes packets associated with VRF 104-3 to support exchange of data between client socket 106-3 and VRF socket 110-3. Thus, when a network device participates in N VRFs, a listening socket is required for each VRF, which means there would be N listening sockets. In a network environment in which N can be hundreds or thousands, and the network device is capable of being managed by every VRF via HTTP, the network device would have to create hundreds or thousands, as the case may be, of HTTP listening sockets, one per VRF, thereby consuming a large amount of memory and processing resources on the network device. Thus, providing VRF-aware sockets alone remains insufficient in terms of addressing resource inefficiencies as multiple listening sockets are still required.

Figure 2:
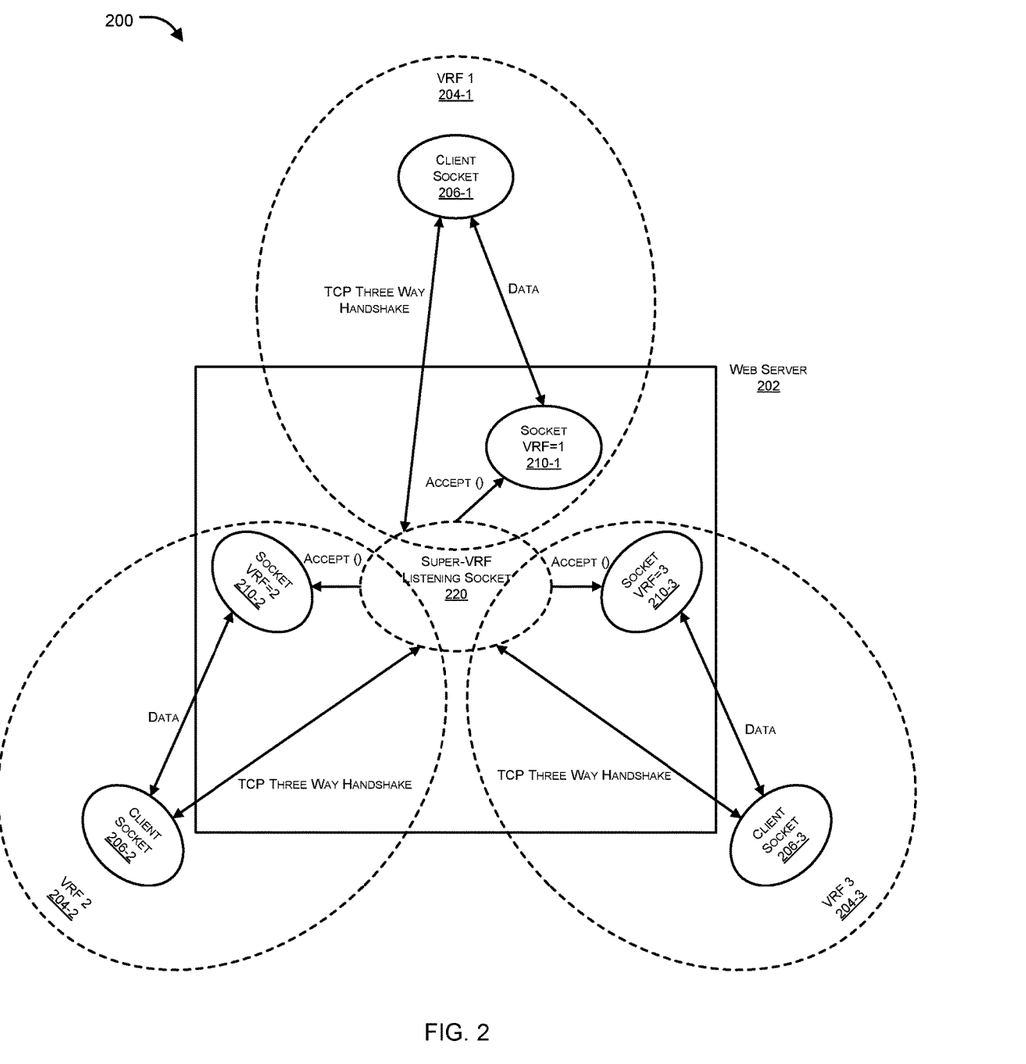
FIG. 2 illustrates a simplified example in which a web server makes use of VRF-aware sockets, including a super-VRF listening socket, to support receipt of remote management commands from multiple VRFs in accordance with an embodiment of the present invention.

FIG. 2 illustrates a simplified example 200 in which a web server 202 makes use of VRF-aware sockets, including a super-VRF listening socket 220, to support receipt of remote management commands from multiple VRFs in accordance with an embodiment of the present invention.

In the context of the present example, a system configured in a network device (e.g., web server 202) participating in multiple VRFs (e.g., VRF 204-1, VRF 204-2 and VRF 204-3) can create a single super-VRF listening socket 220. Hereinafter, VRFs 204-1, 204-2 and 204-3 may be collectively referred to herein as VRFs 204 and may be individually referred to as VRF 204. Super-VRF listening socket 220 can be configured in a manner to receive data packets and requests from any VRF 204 by including VRF identification information. The VRF identification information of a particular socket can be used to control which VRF to use for outgoing data and from which VRF(s) data and requests can be received.

In an implementation involving a client-server network architecture in which client devices are interacting with a server device, sockets 210 are instantiated within the server (e.g. web server 202) and client sockets 206 are instantiated within the respective client devices. Client sockets 206-1, 206-2 and 206-3 may be collectively referred to herein as client sockets 206 and maybe individually referred to herein as client socket 206.

In one embodiment, one or more of the following three fields are added to the existing sock structure to provide the flexibility desired for a super-VRF socket:

sk_svrf—a socket send VRF field that specifies which VRF is to perform lookups for sending outgoing traffic.

sk_rvrf—a socket receive VRF field that specifies which VRF traffic the socket is able to receive.

sk_evrf—a socket event VRF field that remembers which VRF the data that the user-space application just read from. As illustrated below in connection with FIG. 3, this field maintains state information that is useful in connection with allowing a super-VRF listening socket to retain information regarding the VRF from which the last request originated so as to allow the super-VRF listening socket to direct the corresponding response to the VRF from which the last request originated. For a super-VRF listening socket, packets can arrive from different VRFs. In order to know from which VRF a packet was received, developers can retrieve the value of this field after having read the packet. For VRF-aware sockets that are configured to receive VRF traffic from only a single VRF, its sk_rvrf and sk_evrf fields always have the same value.

Those skilled in the art will appreciate there are a number of ways to represent VRF identification so as to reflect the VRF is a super-VRF listening socket that can receive data and requests from any VRFs. One option is to use a special VRF identification value or wildcard VRF identification value. Using this option, setting the socket's receive VRF field (e.g., sk_rvrf above) to a predefined wildcard value configures the socket as one that can receive data from any VRF. Another option is to use a flag to mark the socket as a super-VRF listening socket. For purposes of brevity, in various embodiments described herein, the former approach is used, but it is noted that the invention is not limited to this particular approach.

Continuing with the present example, as discussed above, super-VRF listening socket 220 can receive data and requests from any of VRFs 204. As such, assuming use of the three fields above, the socket receive VRF field (e.g., sk_rvrf) of super-VRF listening socket 220 would be set to a predefined special VRF identification value or a predefined wildcard VRF identification value to mark it as a socket that can receive data and requests from any of VRFs 204.

According to an embodiment, as super-VRF listening socket 220 exists within web server 202, which participates in VRFs 204, it has visibility into data packets and requests from all of VRFs 204. When a connection request arrives at web server 202, a corresponding client-facing VRF socket (210-1, 210-2 or 210-2) is created, by way of modifying existing functionality of the accept( ) method, for example, with its VRF identification set to the VRF 204 to which the requesting client belongs. For example, if the client originating the connection request belongs to VRF 204-1, then socket 210-1 (a VRF-aware socket, but not a super-VRF listening socket) can be created by super-VRF listening socket 202 and assigned to send and receive packets to and from VRF 1 204-1, for example, by setting the socket send VRF field (e.g., sk_svrf) of socket 210-1 to the value associated with VRF 1 204-1 and by setting the socket receive VRF field (e.g., sk_rvrf) of socket 210-1 to the value associated with VRF 1 204-1. Sockets 210-1, 210-2 and 210-3, all of which are VRF-aware sockets, may be collectively referred to herein as sockets 210 (or client-facing sockets 210) and individually referred to as socket 210 (or client-facing socket 210).

In an embodiment, a user-space application associated with web server 202 or web server 202 itself can specify and retrieve VRF identification information of sockets 210. For example, VRF identification information of socket 210-1 can be specified for socket 210-1 via a socket API, similarly, VRF identification of socket 210-2 can be retrieved the socket API. For purposes of illustration, two socket APIs, a set socket option method (e.g., setsockopt( )) and a get socket option (e.g., getsockopt ( )) can be used to set and retrieve, respectively, the VFR identification information for the socket send VRF field (e.g., sk_svrf) or for the socket receive VRF field (e.g., sk_rvrf), for example, depending upon the parameters with the method is invoked as described below.

According to one embodiment, to set the outgoing VRF (e.g., the VRF identification information for the sk_svrf field of a socket), to set the incoming VRF (e.g., the VRF identification information for the sk_svrf field of the socket and to retrieve the VFR from which the socket is configured to accept read data (e.g., the VRF identification information for the sk_rvrf field of the socket) or retrieve the value of skrvfr, the set socket options method and the get socket options methods can be invoked in the following forms:

setsockopt(sockfd, SOL_SOCKET, SEND_VRF, &vrfid, sizeof(vrfid));

setsockopt(sockfd, SOL_SOCKET, RECEIVE_VRF, &vrfid, sizeof(vrfid));

getsockopt(sockfd, SOL_SOCKET, RECEIVE_VRF, &vrfid, &optlen);

where, sockfd is the socket file descriptor;

SOL_SOCKET specifies which level the option (SEND_VRF and RECEIVE_VRF) resides;

SEND_VRF is the name of the option which sets sk_svrf;

RECEIVE_VRF is the name of the option which sets sk_rvrf in setsockopt( ) and retrieves sk_evrf in getsockopt( );

&vrfid is the address at which the identifier of the VRF (e.g., vrfid) is stored;

sizeof (vrfid) specifies the memory size where the VRF ID is stored and is modified on return to indicate the actual size of the value returned; and &optlen initially contains the memory size where VRF ID is stored and is modified on return to indicate the actual size fo the value returned.

While in the present example, the system has been explained in the context of the system operating in the context of a web server, those skilled in the art will appreciate that the system can be implemented in a variety of other network devices, including, but not limited to, proxy servers, routing devices and network security devices (e.g., a network gateway, a firewall, an intrusion detection/prevention system, a unified threat management (UTM) appliance and the like).

Figure 3:
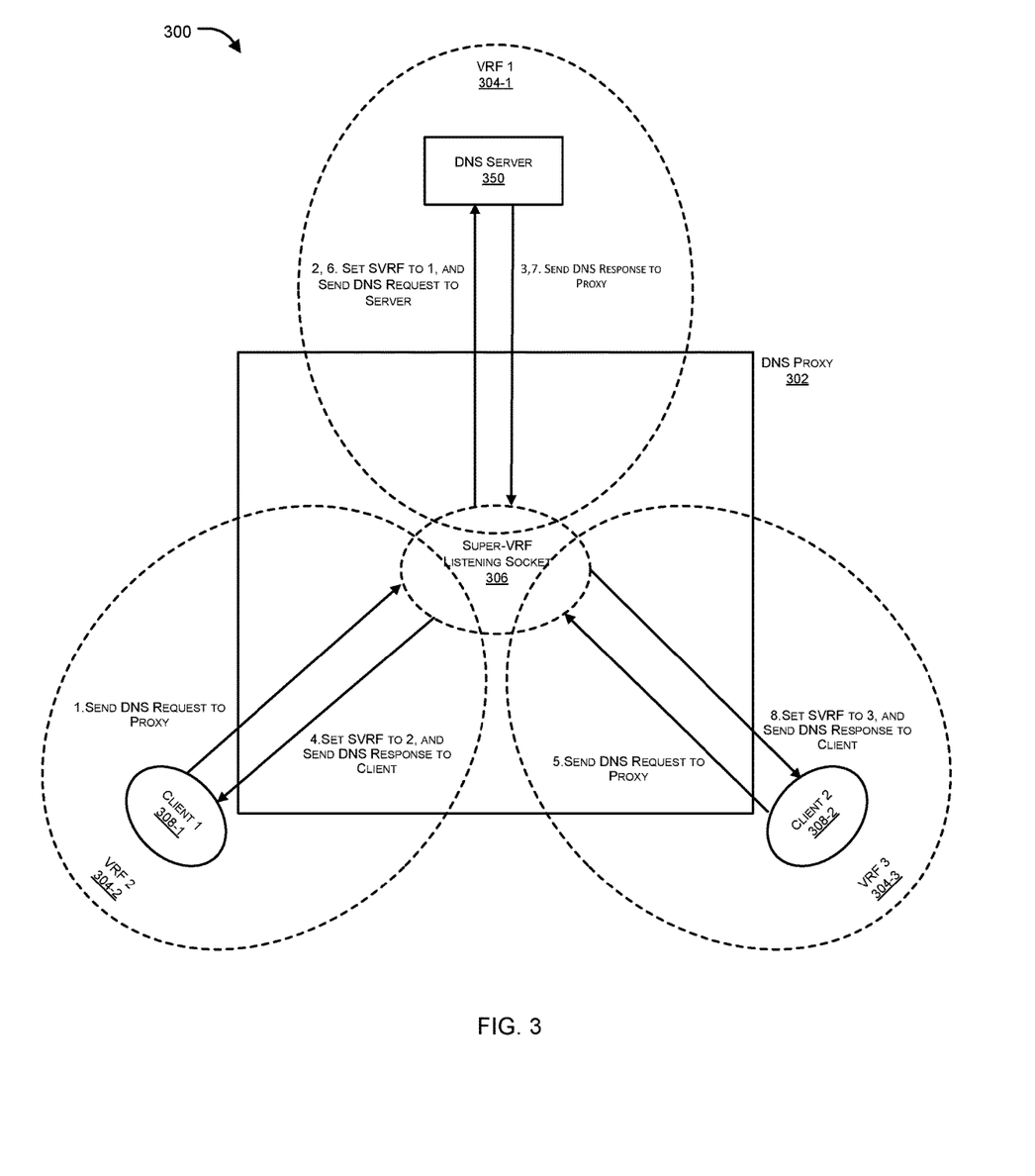
FIG. 3 illustrates a simplified example in which a DNS proxy makes use of a super-VRF listening socket to service DNS queries received from multiple VRFs in accordance with an embodiment of the present invention.

FIG. 3 illustrates a simplified example 300 in which a DNS proxy 302 makes use of a super-VRF listening socket 306 to service DNS queries received from multiple VRFs in accordance with an embodiment of the present invention. In context of the present example, the system implemented on a network device configures a domain name system (DNS) proxy 302 running thereon for interactions with various VRFs (e.g. VRF-304-1, VRF 304-2 and VRF 304-2, which maybe hereinafter collectively referred to as VRFs 304 and individually referred to as VRF 304) in which the network device participates and creates super-VRF listening socket 306 for receiving requests and data from all of VRFs 304. For example, a super-VRF user datagram protocol (UDP) socket can be created and bound to port 53 to listen for DNS traffic. In the present example, DNS server 350 is within a first VRF (e.g., VRF 304-1). When DNS proxy 302 reads a DNS request originated from a second VRF (e.g., VRF 304-2), for example, from a client 308-1, the value of sk_evrf is set to VRF 2 304-2 and DNS proxy 302 calls the socket API to set the value of sk_svrf to VRF 1 304-1. DNS proxy 302 then forwards the DNS request through super-VRF listening socket 306 to DNS server 350 in VRF 1 304-1. When DNS proxy 302 reads a DNS response from DNS server 305 (responsive to the DNS request originated from client 308-1), sk_svrf is set to VRF 2 304-2 (by setting sk_svrf to sk_evrf, which retains information regarding the VFR from which the last read was made). Thus, DNS proxy 302 calls socket API to set the value of sk_svrf to VRF 2 304-2 (from which the corresponding DNS request originated), and forwards the DNS response provided by DNS server 350 to client 308-1 within VRF 2 304-2. Similarly, another client 308-2, within VRF 3 304-3, can initiate a DNS request to DNS proxy 302, which can be sent to DNS server 350 through super-VRF listening socket 306. DNS server 350 can then send a DNS response to DNS proxy 302, which can be relayed to client 308-2 in VRF 3 304-3 through super-VRF listening socket 306.

Figure 4:
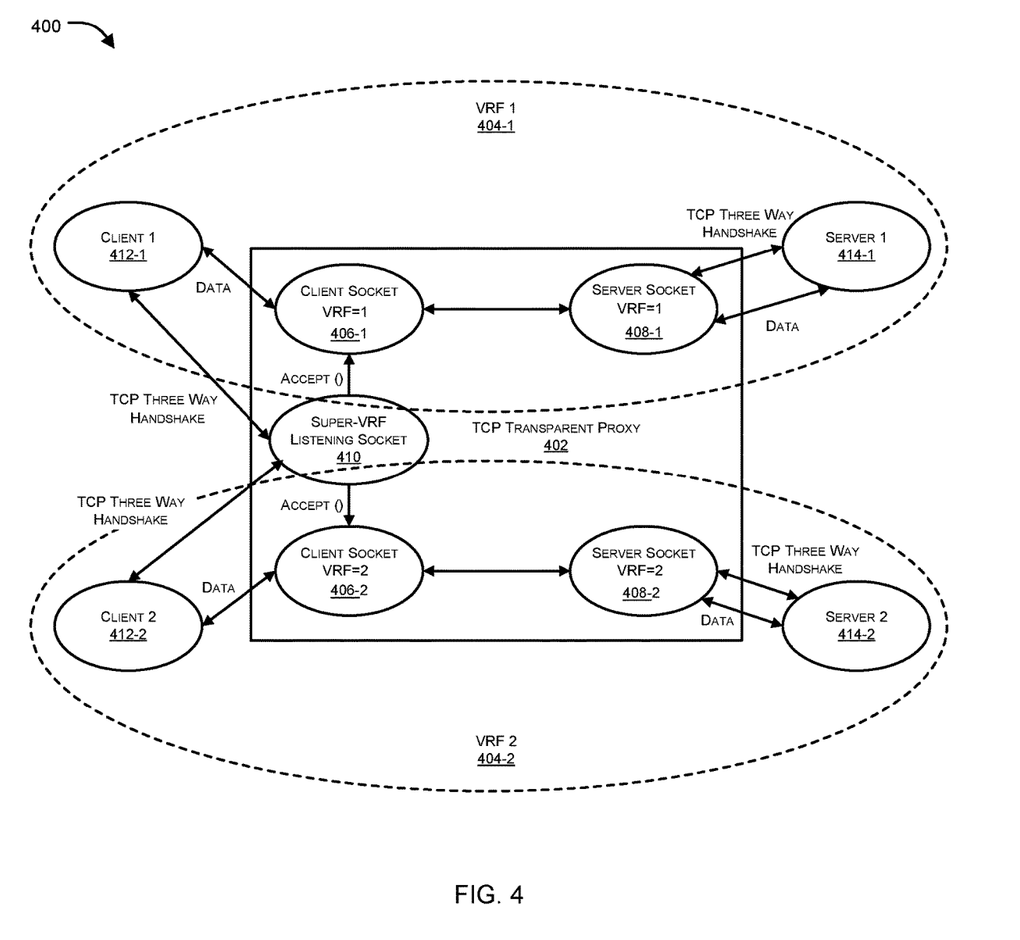
FIG. 4 illustrates a simplified example in which a TCP transparent proxy makes use of VRF-aware sockets, including a super-VRF listening socket, to perform security scanning of network traffic within multiple VRFs in accordance with an embodiment of the present invention.

FIG. 4 illustrates a simplified example 400 in which a TCP transparent proxy 402 makes use of VRF-aware sockets, including a super-VRF listening socket 410, to perform security scanning of network traffic within multiple VRFs in accordance with an embodiment of the present invention. In context of the present example, during start-up, transmission control protocol (TCP) transparent proxy 402 (which may be referred to as proxy 402, hereinafter) creates super-VRF listening socket 410 in a network security device, protecting a private network, for example, to prepare the network security device to accept TCP connection requests and to intercept data from clients within the private network (e.g., client 412-1 and client 412-2, which may be collectively referred to as clients 412 and individually referred to as client 412, hereinafter) and servers within an external network (e.g., server 414-1 and server 414-2, which may be collectively referred to as servers 414 and individually referred to as server 414, hereinafter). Super-VRF listening socket 410 can be created by creating a socket with type of SOCK STREAM by using a socket( ) method of the socket API and setting the sending VRF (e.g., sk_svrf) of the socket to the special VRF identification value or the wildcard VRF identification value via the setsockopt( ) method of the socket API. Thus, the created socket becomes a super-VRF listening socket that can accept connection requests from any VRFs in which the TCP transparent proxy is participating (e.g., VRF 1 404-1 and VRF 2 404-2, which may be collectively referred to as VRF 404 and individually referred to as VRF 404, hereinafter). Further, a specified address can be assigned to super-VRF listening socket 410 by using the bind( ) method of the socket API. Super-VRF listening socket 410 can be marked as a passive socket and a maximum length queue of pending connection requests can be specified by using the listen( ) method of the socket API.

In the context of the present example, when a connection request arrives at the network security device, it is queued in the super-VRF-listening socket 410 and proxy 402 is notified regarding receipt of the connection request. Proxy 420 proceeds to process the connection request by calling the accept( ) method of super-VRF listening socket 410 via the socket API, which extracts the connection request from the queue of pending connections of super-VRF listening socket 410 and creates a new client-facing connected socket (e.g., client socket 406-1 or 406-2 depending upon which VRF from which the connection request was initiated) after handling the TCP three-way handshake with the client 412 and responsive to successful completion of same. Client sockets 406-1 and 406-2 may be collectively referred to as client sockets 406 and individually referred to as client socket 408, hereinafter. The accept( ) method returns the new connected client socket 406 to proxy 402 and the new connected socket has its VRF identification set to the VRF with which the client 412 initiating the connection belongs. Proxy 402 can then retrieve the VRF identification of the newly created client socket 406 by using the getsockopt( ) method of the newly created client socket 406 via the socket API. Further, proxy creates 402 a new server-facing socket for the server side based on the retrieved VRF identification by using the socket( ) method of the socket API. This new server-facing socket (e.g., server socket 408-1 or 408-2, depending upon which VRF from which the connection request was initiated) corresponds to the previously created client socket (e.g., client socket 406-1 or 406-2). Server sockets 408-1 and 408-2 may be collectively referred to as server sockets 408 and individually referred to as server socket 408, hereinafter. In this manner, the VRF identification of server socket 408 is set to be set same as the VRF identification of client socket 406.

After creation of client socket 406 and server socket 408 associated with the appropriate VRF, proxy 402 can instruct the kernel to connect the server socket 408 to the corresponding server 414 by using the connect( ) method of the socket API. Those skilled in the art will appreciate that, the kernel will thereafter send data exchanged between client 412 and server 414 via client socket 406 and server socket 408 (despite the fact that one or more other network devices may have the same IP address as server 414 in another VRF). In this manner, proxy 402 can intercept the data exchanged between client 412 and server 414 and perform desired security scanning (e.g., content inspection, content filtering, data leak prevention, firewalling, traffic shaping, application control, antivirus scanning, intrusion detection, intrusion prevention, Web content filtering, spyware prevention and anti-spam) by one or more security scanning engines (not shown) associated with the network security device (e.g., a firewall, gateway or Unified Threat Management (UTM) appliance) and may event modify the contents if desired, and forwards the data to the appropriate destination if not otherwise blocked or dropped by policies associated with the security scanning.

Figure 5A:
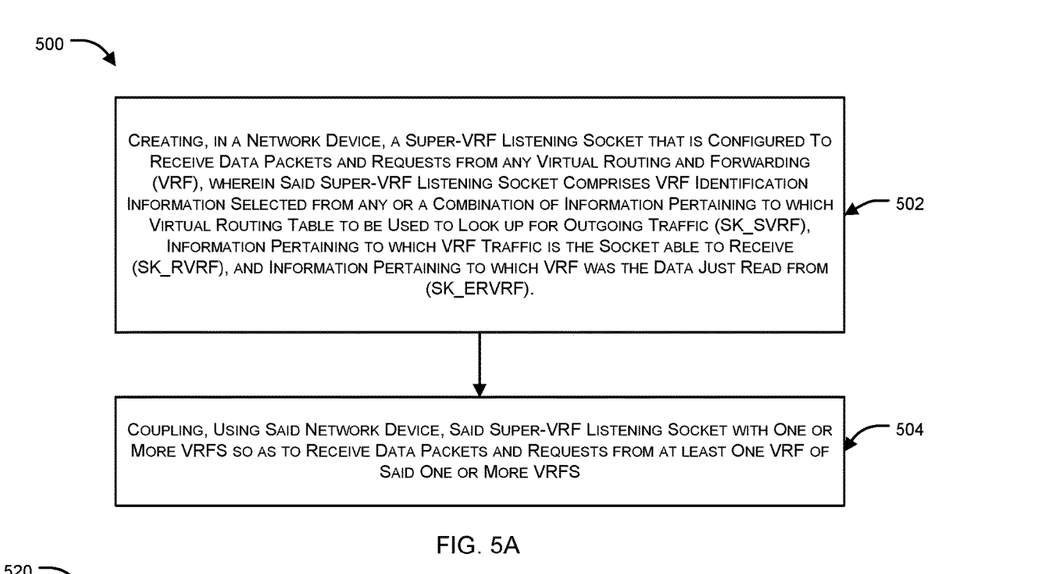
FIG. 5A is a flow diagram illustrating a method for configuration of a super-VRF listening socket in a network device in accordance with an embodiment of the present invention.

FIG. 5A is a flow diagram 500 illustrating a method for configuration of a super-VRF listening socket in a network device in accordance with an embodiment of the present invention. In context of the present example, the method begins, at block 502, by creating a super-VRF listening socket in a network device. The super-VRF listening socket is configured to receive data packets and requests from any virtual routing and forwarding (VRF) domain in which the network device participates. Each VRF maintains its respective virtual routing table for routing of traffic. The super-VRF listening socket includes VRF identification information selected from any or a combination of information pertaining to which virtual routing table to be used to look up for outgoing traffic (e.g., an sk_svrf field), information pertaining to which VRF from which the socket is able to receive traffic (e.g., an sk_rvrf field), and information pertaining to the last VRF from which the socket read data (e.g., an sk_ervrf field). The value of the sk_rvrf field for the super-VRF listening socket can indicate that the super-VRF listening socket is able to receive data packets and requests from any VRF domain in which the network device participates.

Further, at block 504, the super-VRF listening socket is coupled with one or more VRFs so as to receive data packets and requests from at least one VRF of said one or more VRFs.

Figure 5B:
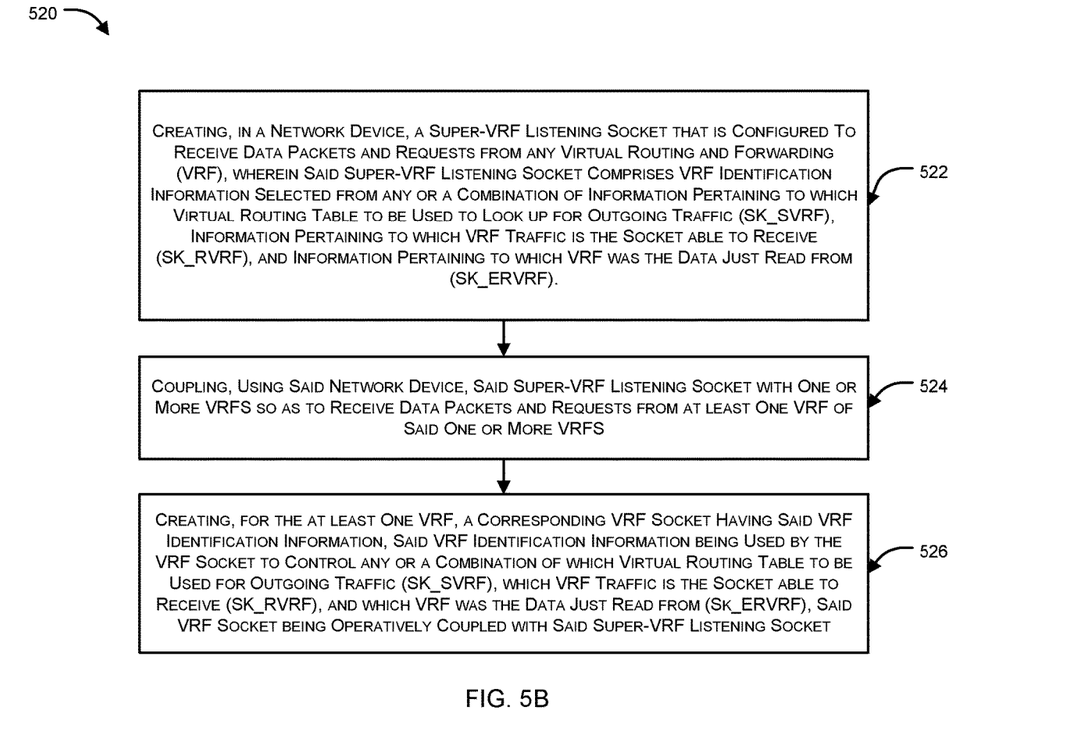
FIG. 5B is a flow diagram illustrating a method for configuration of a VRF-aware socket in a network device in accordance with an embodiment of the present invention.

FIG. 5B is a flow diagram 520 illustrating a method for configuration of a VRF-aware socket in a network device in accordance with an embodiment of the present invention. In context of the present example, at block 522 and 524, a super-VRF listening socket is created and coupled with at least one other VRF-aware socket in accordance with blocks 502 and 504. At block 524, for the at least one other VRF-aware socket, it includes VRF identification information, which can be used by the VRF-aware socket to control any or a combination of which virtual routing table is to be used for outgoing traffic (e.g., sk_svrf), which VRF(s) from which the VRF-aware socket is able to receive traffic (e.g., sk_rvrf), and the VRF from which data was last read by the VRF-aware socket (e.g., sk_ervrf), the VRF-aware socket being operatively coupled with the super-VRF listening socket.

Figure 5C:
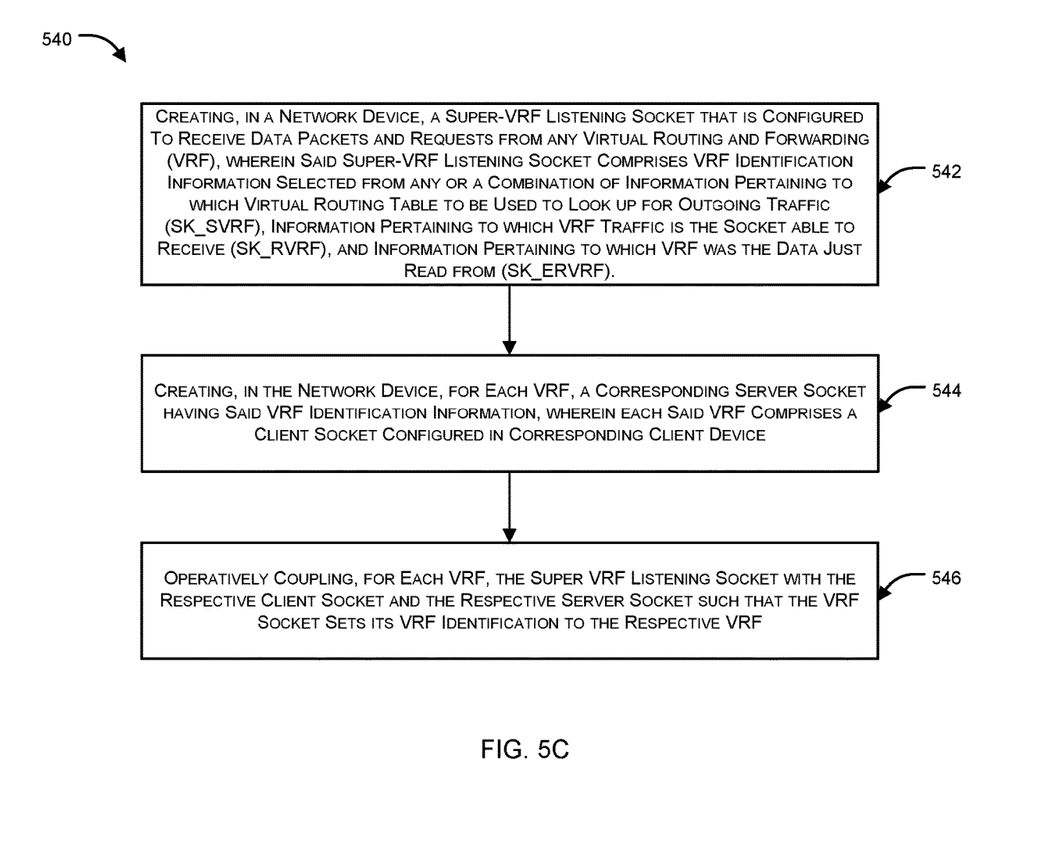
FIG. 5C is a flow diagram illustrating a method in which a VRF-aware socket is used in a client server architecture in accordance with an embodiment of the present invention.

FIG. 5C is a flow diagram 540 illustrating a method in which a VRF-aware socket is used in a client server architecture in accordance with an embodiment of the present invention. In context of the present example, at block 542, a super-VRF listening socket is configured in a web network device in a similar manner as described above with reference to block 502.

At block 544, for each VRF, a corresponding VRF-aware server socket is created that has VRF identification information. Each VRF also includes a client socket configured within the corresponding client device.

At block 546, for each VRF, the super-VRF listening socket is operatively coupled with the respective client socket and the respective server socket such that the VRF socket sets its VRF identification to the respective VRF.

Figure 5D:
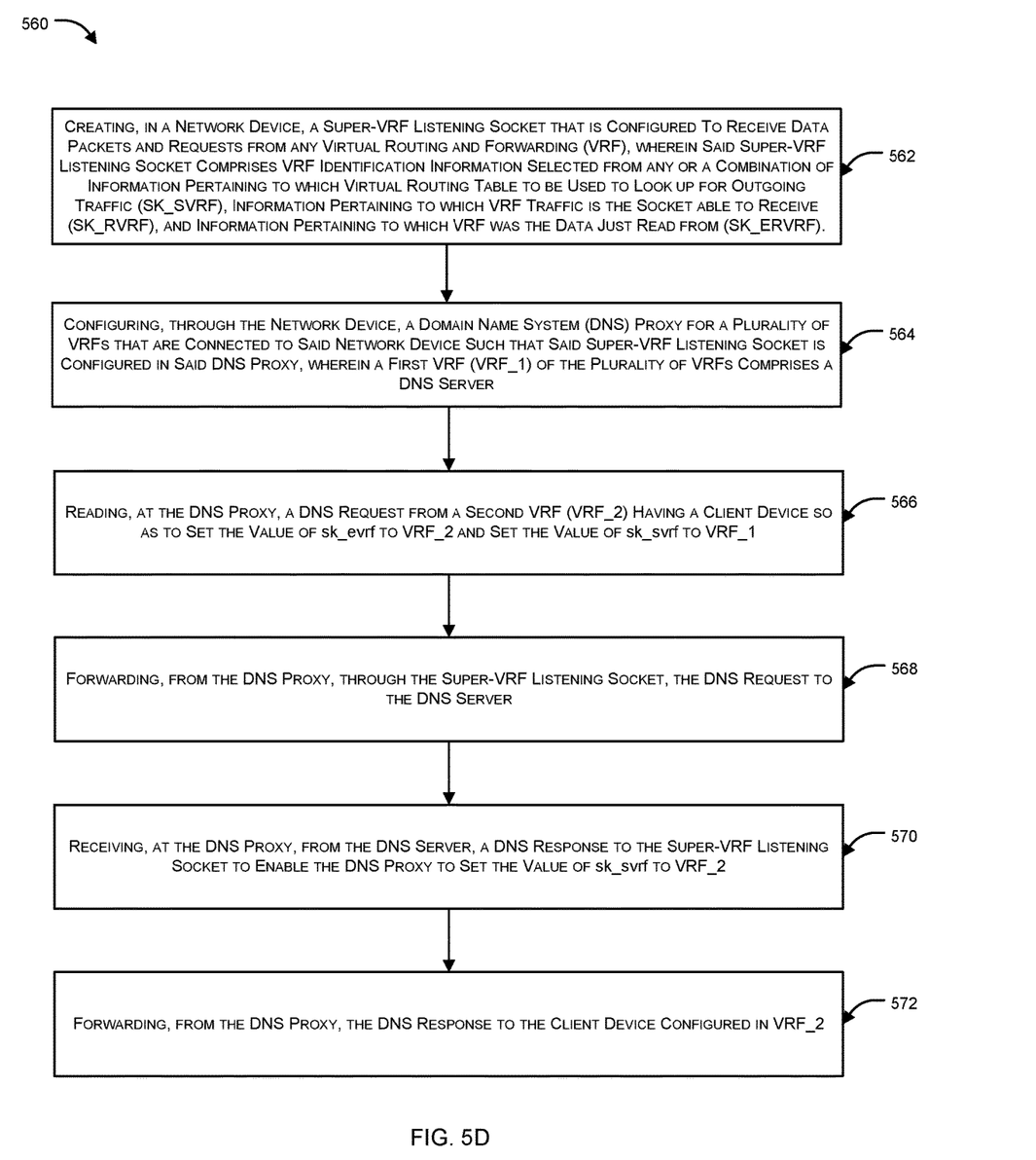
FIG. 5D is a flow diagram illustrating a method in which a DNS proxy makes use of a super-VRF listening socket to service DNS queries received from multiple VRFs in accordance with an embodiment of the present invention.

FIG. 5D is a flow diagram 560 illustrating a method where a DNS proxy makes use of a super-VRF listening socket to service DNS queries received from multiple VRFs in accordance with an embodiment of the present invention. In context of the present example, at block 562, a super-VRF listening socket is configured in a network device, in a similar manner as described above with reference to block 502.

At block 564, a DNS proxy is configured for multiple of VRFs in which the network device participates such that the super-VRF listening socket is configured in the DNS proxy. In this example, it is assumed that a first VRF (VRF_1) of the multiple VRFs includes a DNS server.

At block 566, a DNS request is received from a second VRF (VRF_2) having a client device, which results in the value of sk_evrf of the super-VRF listening socket to be set to VRF_2. In one embodiment, the super-VRF listening socket maintains state information (e.g., sk_evrf) to facilitate returning of a DNS response to the VRF from which the DNS response originated. As such, responsive to receipt of the DNS request from a client device associated with VRF_2, for example, the super-VRF listening socket sets its sk_evrf field to VRF_2. In order to allow the super-VRF listening socket to send the DNS request to VRF_1 in which the DNS server resides, the DNS proxy sets the value of sk_svrf of the super-VRF listening socket to VRF_1 via the socket API so that, at block 568, the DNS request can be forwarded to the DNS server through the super-VRF listening socket.

Further, at block 570, a DNS response is received by the DNS proxy from the DNS server by the super-VRF listening socket. In one embodiment, the sk_evrf field is accessible to the DNS proxy via the socket API to enable the DNS proxy to set the value of sk_svrf to the value of sk_evrf (i.e., VRF_2 in the current example) so that at block 572, the DNS response can be forwarded from the DNS proxy via the super-VRF listening socket to the client device in VRF_2 that originated the DNS request.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 6:
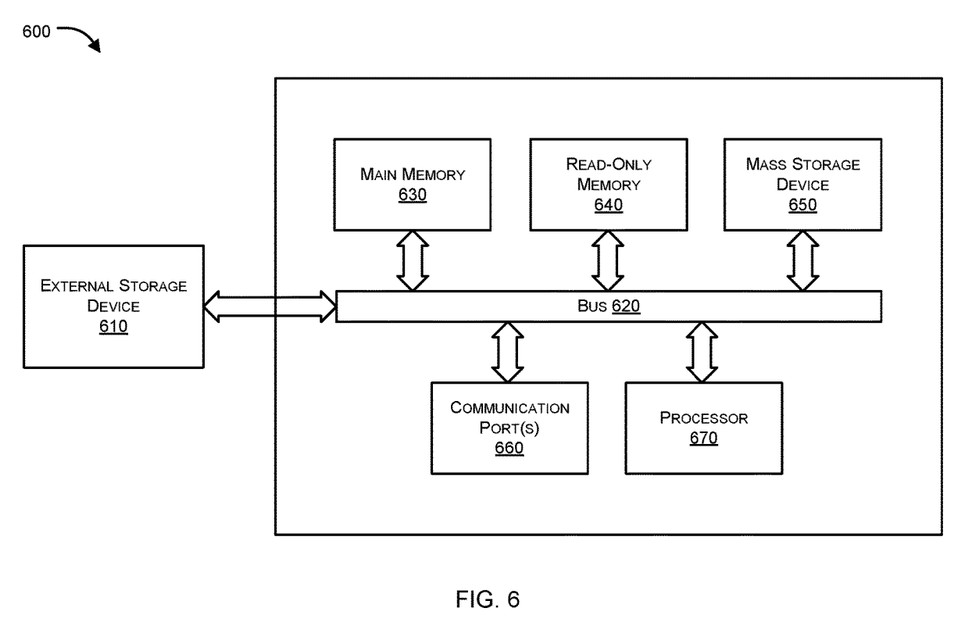
FIG. 6 illustrates an exemplary computer system in which or with which embodiments of the present invention may be utilized.

FIG. 6 illustrates an exemplary computer system 600 in which or with which embodiments of the present invention may be utilized. Computer system 600 may represent a network device (e.g. a web server, a router, a network gateway, etc.) or a network security device. As shown in the figure, computer system 600 includes an external storage device 610, a bus 620, a main memory 630, a read only memory 640, a mass storage device 650, communication port 660, and a processor 670. A person skilled in the art will appreciate that computer system 600 may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system 600 connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g., start-up or BIOS instructions for processor 670. SANs and VSANs may also be deployed.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi store bucket 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc. Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g., a display, keyboard, and a cursor control device, may also be coupled to bus 620 to support direct operator interaction with computer system 600. Other operator and administrative interfaces can be provided through network connections connected through communication port 660.

External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
    creating, by a user-space application running on the network device that maintains a virtual routing table for each virtual routing and forwarding (VRF) domain of a plurality of VRF domains, a VRF-aware listening socket, wherein the user-space application comprises a domain name system (DNS) proxy, wherein the VRF-aware listening socket includes VRF identification information selected from any or a combination of:
        information pertaining to which of the plurality of virtual routing tables is to be used to look up routing or forwarding information for outgoing network traffic;
        information pertaining to one or more VRF domains from which the VRF-aware listening socket is able to receive incoming network traffic; and
        information pertaining to a last VRF domain of the plurality of VRF domains from which the VRF-aware listening socket most recently read data;
    configuring, by the user-space application, the VRF-aware listening socket to be a super-VRF listening socket that is capable of receiving incoming network traffic from all of the plurality of VRF domains by setting the information pertaining to the one or more VRF domains to a wildcard value;
    receiving from a client device associated with a first VRF domain of the plurality of VRF domains, by the super-VRF listening socket, a DNS request on behalf of the user-space application;
    responsive to said receiving, maintaining state information in the super-VRF listening socket to facilitate forwarding to the client device of a DNS response from a DNS server to the DNS request, by setting, by the super-VRF listening socket, the information pertaining to the last VRF domain of the plurality of VRF domains from which the VRF socket most recently read data to the first VRF domain;
    causing, by the DNS proxy, the DNS request to be sent to the DNS server by setting the information pertaining to which of the plurality of virtual routing tables is to be used to look up routing or forwarding information for outgoing network traffic to a second VRF domain with which the DNS server is associated; and
    responsive to receipt by the super-VRF listening socket of the DNS response, causing, by the DNS proxy, the DNS response to be sent to the client device by setting the information pertaining to which of the plurality of virtual routing tables is to be used to look up routing or forwarding information for outgoing network traffic to the information pertaining to the last VRF domain of the plurality of VRF domains from which the VRF socket most recently read data.

2. The method of claim 1, wherein the user-space application comprises a Transmission Control Protocol (TCP) proxy.

3. The method of claim 1, wherein the request comprises a connection request.

4. The method of claim 3, further comprising:
    responsive to successful completion of a TCP three-way handshake between the super-VRF listening socket and the client device, creating, by the super-VRF listening socket a client socket to interface with the client device; and
    creating, by the TCP proxy, a server socket corresponding to the client socket to interface with a server associated with the connection request.

5. The method of claim 4, wherein the network device comprises a network security device and wherein the method further comprises enabling the network security device to perform security scanning on data attempting to be transferred between the client device and the server by the TCP proxy intercepting the data and invoking the security scanning.

6. The method of claim 1, wherein the user-space application comprises a web server.

7. The method of claim 1, wherein a socket application programming interface is provided through which the user-space application is able to set the information pertaining to which of the plurality of virtual routing tables is to be used to look up routing or forwarding information for outgoing network traffic and the information pertaining to one or more VRF domains from which the VRF-aware socket is able to receive incoming network traffic.

8. A network device comprising:
one or more processors;
a virtual routing table for each virtual routing and forwarding (VRF) domain of a plurality of VRF domains;
a non-transitory computer readable storage medium embodying a set of instructions, which when executed by the one or more processors cause the one or more processors to perform a method comprising:
creating, by a user-space application running on the network device, a VRF-aware listening socket, wherein the user-space application comprises a domain name system (DNS) proxy, wherein the VRF-aware listening socket includes VRF identification information selected from any or a combination of:
information pertaining to which of the plurality of virtual routing tables is to be used to look up routing or forwarding information for outgoing network traffic;
information pertaining to one or more VRF domains from which the VRF-aware listening socket is able to receive incoming network traffic; and
information pertaining to a last VRF domain of the plurality of VRF domains from which the VRF-aware listening socket most recently read data;
configuring, by the user-space application, the VRF-aware listening socket to be a super-VRF listening socket that is capable of receiving incoming network traffic from all of the plurality of VRF domains by setting the information pertaining to the one or more VRF domains to a wildcard value;
receiving from a client device associated with a first VRF domain of the plurality of VRF domains, by the super-VRF listening socket, a DNS request on behalf of the user-space application
responsive to said receiving, maintaining state information in the super-VRF listening socket to facilitate forwarding to the client device of a DNS response from a DNS server to the DNS request, by setting, by the super-VRF listening socket, the information pertaining to the last VRF domain of the plurality of VRF domains from which the VRF socket most recently read data to the first VRF domain;
causing, by the DNS proxy, the DNS request to be sent to the DNS server by setting the information pertaining to which of the plurality of virtual routing tables is to be used to look up routing or forwarding information for outgoing network traffic to a second VRF domain with which the DNS server is associated; and
responsive to receipt by the super-VRF listening socket of the DNS response, causing, by the DNS proxy, the DNS response to be sent to the client device by setting the information pertaining to which of the plurality of virtual routing tables is to be used to look up routing or forwarding information for outgoing network traffic to the information pertaining to the last VRF domain of the plurality of VRF domains from which the VRF socket most recently read data.

9. The network device of claim 8, wherein the user-space application comprises a Transmission Control Protocol (TCP) proxy.

10. The network device of claim 9, wherein the request comprises a connection request.

11. The network device of claim 10, wherein the method further comprises:
responsive to successful completion of a TCP three-way handshake between the super-VRF listening socket and the client device, creating, by the super-VRF listening socket a client socket to interface with the client device; and
creating, by the TCP proxy, a server socket corresponding to the client socket to interface with a server associated with the connection request.

12. The network device of claim 11, wherein the network device comprises a network security device and wherein the method further comprises enabling the network security device to perform security scanning on data attempting to be transferred between the client device and the server by the TCP proxy intercepting the data and invoking the security scanning.

13. The network device of claim 8, wherein a socket application programming interface is provided through which the user-space application is able to set the information pertaining to which of the plurality of virtual routing tables is to be used to look up routing or forwarding information for outgoing network traffic and the information pertaining to one or more VRF domains from which the VRF-aware socket is able to receive incoming network traffic.

14. A non-transitory, computer-readable media, storing source code that, when executed by a processor, performs a method comprising:
creating, by a user-space application running on the network device that maintains a virtual routing table for each virtual routing and forwarding (VRF) domain of a plurality of VRF domains, a VRF-aware listening socket, wherein the user-space application comprises a domain name system (DNS) proxy, wherein the VRF-aware listening socket includes VRF identification information selected from any or a combination of:
information pertaining to which of the plurality of virtual routing tables is to be used to look up routing or forwarding information for outgoing network traffic;
information pertaining to one or more VRF domains from which the VRF-aware listening socket is able to receive incoming network traffic; and
information pertaining to a last VRF domain of the plurality of VRF domains from which the VRF-aware listening socket most recently read data;
configuring, by the user-space application, the VRF-aware listening socket to be a super-VRF listening socket that is capable of receiving incoming network traffic from all of the plurality of VRF domains by setting the information pertaining to the one or more VRF domains to a wildcard value;
receiving from a client device associated with a first VRF domain of the plurality of VRF domains, by the super-VRF listening socket, a DNS request on behalf of the user-space application;
responsive to said receiving, maintaining state information in the super-VRF listening socket to facilitate forwarding to the client device of a DNS response from a DNS server to the DNS request, by setting, by the super-VRF listening socket, the information pertaining to the last VRF domain of the plurality of VRF domains from which the VRF socket most recently read data to the first VRF domain;
causing, by the DNS proxy, the DNS request to be sent to the DNS server by setting the information pertaining to which of the plurality of virtual routing tables is to be used to look up routing or forwarding information for outgoing network traffic to a second VRF domain with which the DNS server is associated; and responsive to receipt by the super-VRF listening socket of the DNS response, causing, by the DNS proxy, the DNS response to be sent to the client device by setting the information pertaining to which of the plurality of virtual routing tables is to be used to look up routing or forwarding information for outgoing network traffic to the information pertaining to the last VRF domain of the plurality of VRF domains from which the VRF socket most recently read data.

\* \* \* \* \*